INVENTOR
T. C. FRY
BY
E. V. Griggs
ATTORNEY

July 7, 1942.                    T. C. FRY                    2,288,694
              METHOD OF AND APPARATUS FOR EXTRACTING ENERGY
                  FROM A BEAM OF VELOCITY MODULATED ELECTRONS
                          Filed May 11, 1940           2 Sheets-Sheet 2
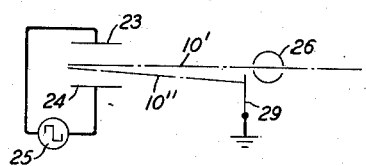
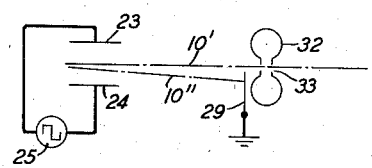
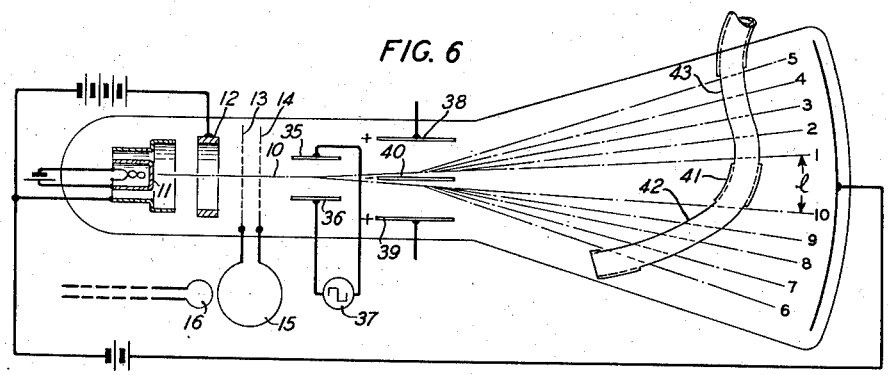
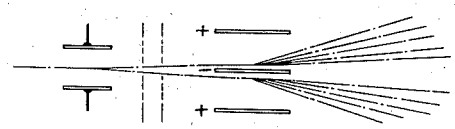
INVENTOR
T. C. FRY
BY
E. V. Griggs
ATTORNEY Patented July 7, 1942

2,288,694

UNITED STATES PATENT OFFICE 2,288,694

METHOD OF AND APPARATUS FOR EXTRACTING ENERGY FROM A BEAM OF VELOCITY MODULATED ELECTRONS

Thornton C. Fry, Wyoming, N. J., assignor to Bell Telephone Laboratories, Incorporated, New York, N. Y., a corporation of New York Application May 11, 1940, Serial No. 334,547

8 Claims. (Cl. 179—171)

This invention relates to methods of and apparatus for the transfer of energy from electron beams to electromagnetic fields. More particularly, it relates to methods and devices for extracting energy from a beam of velocity modulated electrons.

An object of the invention is to enable efficient transfer of energy from an electron beam to an adjacent electromagnetic field.

An additional object of the invention is to facilitate coupling of high frequency electronic apparatus such as oscillators or amplifiers to transmission systems.

A further object of the invention is to enable a cathode ray device and a wave guide to be so associated that high frequency energy of the cathode ray beam may be transferred to the wave guide without the use of the usual transformer or electric coupling device.

An additional object of the invention is to render the electromagnetic wave transmission velocity along a given course substantially equal to the effective electron propagation velocity along the same course whereby an efficient coupling between an electron beam and a transmission path following the course may be had.

Another object of the invention is to direct the energy of electrons of a beam toward individual points of a wave energy transmission path in accordance with the relative times at which the electrons pass a definite control point in their path.

In accordance with the invention a cathode beam is subjected to a velocity modulating action and is thereafter passed between deflecting members which deflect the individual electrons from their original course in a degree dependent upon their respective velocities. A wave guide slotted to enable electrons to pass transversely through it is positioned across the paths of the electrons in such manner that the deflected beam sweeps the wave guide longitudinally at the velocity of electromagnetic waves in the guide. The wave guide is thereby enabled to extract energy from the beam. The reverse sweep of the cathode beam may be diverted from the wave guide or may be caused to sweep another portion of the guide in such fashion as to add to the effect of the forward sweep.

The various features and objects of the invention and the structure and operation of systems involving it may best be understood from a consideration of the following specification and appended claims taken in connection with the accompanying drawings in which:

Figs. 4 and 5 show modifications of the wave guide element of Fig. 3;

Fig. 6 illustrates a modification of the apparatus of Fig. 3 designed to utilize both the accelerated and the retarded half cycles of a velocity modulated electron beam; and Fig. 7 is a schematic diagram showing a modification of the alternating deflector of the system of Fig. 6.

Figure 1:
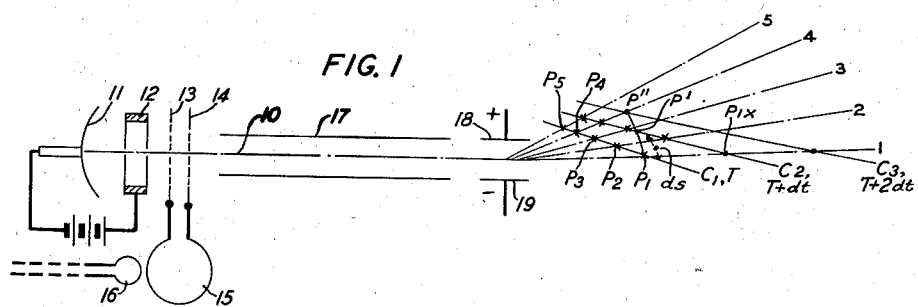
Fig. 1 is a schematic diagram illustrating the operation of one embodiment of the invention.

Certain underlying principles of the invention may be readily understood from a consideration of the diagram of Fig. 1 in which a monochromatic electron stream or cathode ray beam indicated by a dotted line 10 is produced by an electron gun having a cathode 11 and a highly positive accelerating electrode 12. The electron beam passes between the velocity modulating grids 13 and 14 and its electrons are there subjected to a velocity modulation in accordance with the instantaneous potential difference between the grids. These grids may be connected to a resonant chamber 15 coupled in any well-known manner to an input circuit 16. After the velocity modulation, the beam may be caused to traverse the space within a drift tube 17 and thereafter to pass between the deflecting plates 18 and 19 between which a fixed unidirectional electromotive force is applied as indicated. Suppose that we note the paths of electrons which pass the modulating grids 13, 14 at the instants $t_1$, $t_2$ to $t_5$, inclusive, indicated in Fig. 2 which shows a graph 20 of the electromotive force between modulating grids 13 and 14. The electrons will emerge from the zone of the modulating grids with different velocities. Let us assume that the electron passing the grids at instant $t_1$ is given the highest velocity and that passing at instant $t_5$, the lowest. After passing the deflector plates 18 and 19 the electrons will travel along divergent paths as, for example, 1, 2, 3, 4 and 5. The highest speed electron corresponding to instant $t_1$ will be least deflected and will follow the path 1. The lowest speed electron will proceed along the path 5. At some instant T the electron of $t_1$ has reached the point $P_1$, and the later emitted and slower electron of instant $t_2$ has reached the position $P_2$ on the course 2. In this same manner we may determine the points $P_3$, $P_4$, $P_5$ of a curve $C_1$ which represents the locus of the successively emitted electrons at the time T. At a slightly later time $T+dt$, the electron of instant $t_1$ may have reached a point $P_{1x}$ through which we may draw the locus $C_2$ of the positions of the various electrons at that instant. It will be noted that the higher speed electrons continue to advance or gain in position relatively to the lower speed electrons which follow. In the same manner a locus $C_3$ may be plotted for the time $T+2dt$. We wish to associate with the diverging beam of electrons a section of a wave guide which shall be so disposed that each electron as it enters the field of the guide may yield maximum energy to that field. This will happen if the transit of the electron through the wave guide field occurs at such an instant that the field offers maximum opposition to the motion of the electron thus tending to slow it down and to absorb energy from it. Let us suppose, for example, that the wave guide extends through the point $P_1$ and that there is propagated along the wave guide a wave of such character that at the instant T when the electron along course 1 reaches the point $P_1$ the field in the wave guide at that point presents a maximum retarding force to that electron. The course of the wave guide should proceed from $P_1$ in such a direction that at a time $dt$ later or at the instant $T+dt$ the maximum opposing field will have moved along the guide to a point $P'$ where an electron is just arriving or at some point on the curve $C_2$. In order for the field to have advanced just far enough the wave guide should have a length $ds$ between $P_1$ and the point $P'$ on the curve $C_2$ just equal to the distance in which the field advances during the time $dt$. If $v$ be the propagation velocity of the field along the guide the distance $ds$ will be equal to $vdt$. Accordingly, if a length of guide $vdt$ be so disposed beginning at point $P_1$ as to terminate at a point $P'$ on curve $C_2$ it will permit the maximum adverse or opposing field of the guide to reach $P'$ just as the corresponding electron of the electron beam front $C_2$ reaches the same point. Similarly, point $P''$ may be so determined on curve $C_3$ that the distance along the guide from $P'$ to $P''=vdt$. In fact, each and every point in which the wave guide crosses the diverging rays of the shifting beam may be ascertained in that same manner.

As the velocity of the electrons approaches one of its limits the beam will tend to reverse the direction in which it sweeps the wave guide. This would introduce a conflicting force and it is therefore desirable to prevent the reverse sweep from affecting the guide. This may be accomplished by the use of cross-field electrostatic deflectors as shown in Figs. 3, 4 and 5.

Figure 2:
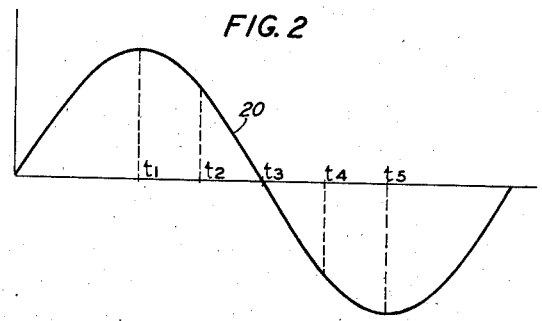
Fig. 2 is a graph to aid in the explanation of Fig. 1.
Figure 3:
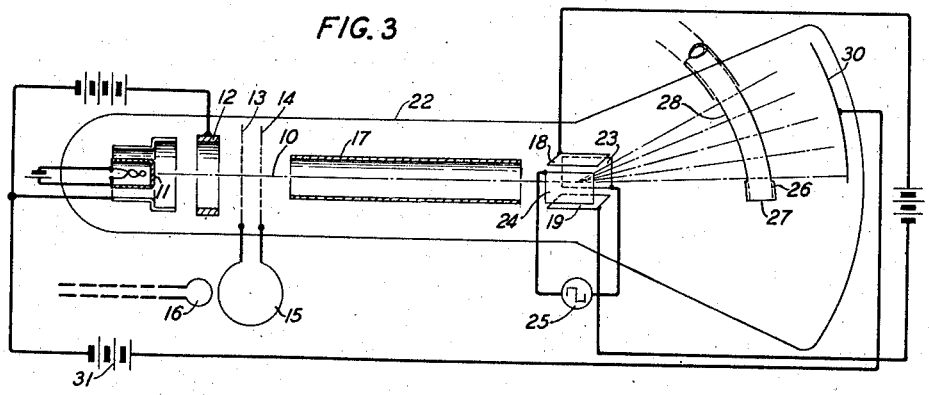
Fig. 3 illustrates an amplifier embodying the invention.

Fig. 3 illustrates a cathode ray beam device for amplifying high frequency oscillations employing the principles which have been presented in connection with Figs. 1 and 2. An evacuated envelope 22 encloses an apparatus of the type which has been discussed and which also includes the cross-deflecting plates 23, 24 between which a reversing unidirectional or square-topped electromotive force is impressed by source 25. The wave guide includes a section 26 introduced within the cathode ray device and consisting of a metallic tube closed at its end 27 and provided with a transverse slot 28 through which the electron beam sweeps on its forward course as indicated by 10' in Figs. 4 and 5. The position 10' in which the beam is aligned with the slot 28 is determined by one polarity of the source 25 which is synchronized in any desired manner with the modulating source. At the moment of minimum electron velocity the source 25 reverses in polarity and deflects the beam to the position 10'' in which the beam is directed against a conductor 29 which is grounded to withdraw the velocity modulated electrons of that half cycle from the field of action. On the next forward sweep of the beam the source 25 reverses polarity and energy is again imparted by the electrons to the field along the wave guide.

The device 22 is also provided with a collector 30 which is positively polarized by source 31 to a potential sufficient to withdraw the spent electrons from the zone of action.

The drift tube 17 may be omitted if desired. It increases the length of the path which the electrons travel after the frequency modulation and it accordingly increases the distance by which the high velocity electron of $t_1$ leads the slower electron of $t_2$. In some instances this facilitates the design of the wave guide by permitting the desired length of guide to be introduced into a smaller cathode ray tube envelope.

Fig. 4 illustrates diagrammatically a cross-section of the divergent ray portion of the tube to show the operation of the alternating potential deflector in switching the beam from the slot position to the collector 29.

Fig. 5 is similar to Fig. 4 but illustrates a modified type of wave guide 32 in which the slot passes through a constricted central portion 33. This structure has the advantage of a high impedance along the electron beam path with an attendant high intensity electric field which increases the efficiency of the wave guide in extraction of energy from the electrons which traverse its field.

Fig. 6 illustrates a modification of the apparatus of Fig. 3 in which the drift tube is omitted and provision is made for utilizing both halves of each cycle of the modulated electron stream. The electron gun and modulating grids correspond to those of Fig. 3 and are similarly designated. After passing through the modulating grids the electron beam 10 passes between a pair of alternating deflector plates 35 and 36. A source 37 applies a square-topped alternating electromotive force in such manner that the beam as a whole is deflected alternately toward unidirectional deflecting plates 38 and 39. Plates 38 and 39 are both maintained at a positive potential. An intermediate plate 40 is made negative. Assume, for example, that as the electrons having maximum velocity reach plates 35 and 36 the potential suddenly reverses and deflects the beam toward plate 35. The beam thereafter passes between plates 40 and 38 and its successive electrons are caused to follow diverging paths 1, 2, 3, 4 and 5 in the manner already explained in connection with Fig. 1. When subsequently the minimum velocity electrons reach plates 35 and 36 the deflecting potential reverses to direct the beam between plates 40 and 39. The electron following course 6 will, like that following course 5, be deflected most widely from the central linear course. The locus of the points through which the wave guide 41 passes may be determined as in the case of Fig. 1. It will not be symmetrical with respect to the center line of the cathode beam since on one side the sweep is by progressively slower electrons and on the other by progressively faster ones. Assuming that the electron of course 10 is followed by the next electron of course 1 at the same interval that separates the courses 9 and 10 the distance $l$ along the wave guide should be equal to an integral number of wave-lengths plus the common interval or $$l = n\lambda + vdt$$

It will be seen that with this arrangement the electron beam sweeps first the slot 42 and then the slot 43 and returns to its initial position without a reverse sweep to repeat the cycle. Accordingly, electromagnetic wave energy is imparted to the wave guide by an energy transfer from the velocity modulated electron beam. The position of the wave guide has been determined relatively to the paths 1, 2, 3, 4, 5 of Fig. 1 which are the paths followed by the electrons when the alternating voltage on the electrodes 13, 14 has the amplitude shown in Fig. 2. Accordingly, in systems for transfer of substantially constant amplitude oscillation energy the broken line positions 1 to 5, inclusive, represent the trajectories of the selected electrons emitted at intervals of one-eighth of a cycle. However, if the amplitude of the oscillation energy to be transferred is caused to fluctuate between zero and the value indicated in Fig. 2, the variations which give rise to the fan of electrons 1, 2, 3, 4 will also fluctuate, and the fan will open and close. Since the wave guide has been designed to extract as much energy as possible when the fan is open, and extracts progressively less as the fan closes, the energy in the wave guide will wax and wane with the current in the input circuit 16.

It will be understood that the electromotive force applied to the alternating current deflector plates 35 and 36 should be synchronized with the frequency of the wave to be propagated in the wave guide. The most efficient energy transfer will occur if the deflecting electromotive force wave be square-topped and if it be so phased that the reversals occur at the maximum and minimum velocities of the velocity modulated electrons, that is, when the maximum velocity electrons and the minimum velocity electrons reach the most effective deflecting zone.

Fig. 7 indicates diagrammatically a modification of the structure of Fig. 6 in which the alternating current deflecting plates are placed in advance of the velocity modulating grids. This device has the advantage that a somewhat more uniform deflection of the entire beam may be attained while the electrons are proceeding at the same speed. Moreover, the necessary positional separation of the two half cycles of the beam may be attained with a somewhat smaller deflecting force since the lateral acceleration once imparted is effective for a longer time.

It will also be understood that in the systems of Figs. 3, 4, 5, 6 and 7 a drift tube such as 17 may be employed or omitted as desired. It will be recalled that its effect is to permit a predetermined advance of the differing speed electrons along their respective courses free from the effects of varying extraneous electric fields and that it does not serve as in the conventional type of device to "bunch" electrons of different speeds along a common course since in the systems utilizing this invention there is an individual course for each speed of electron.

In lieu of the fixed electrostatic deflector field a fixed magnetic field may be employed to cause the electrons to fan out. This field which may be produced either by a permanent magnet or a coil or other magnetic field source should of course be directed at right angles both to the normal axis of the electron beam and to the direction which the electrostatic field which it replaces would require.

What is claimed is:

1. The method which comprises velocity modulating an electron stream in accordance with a periodic control force deflecting the electrons laterally from the normal electron stream path in accordance with their velocities and causing the laterally deflected electrons to sweep along a wave energy guide longitudinally and along the periphery thereof at a rate approximating the wave propagation velocity along the guide.

2. In combination, a source of electrons, means for causing the electrons to pass as a beam toward a collector, means for modulating the velocities of the electrons of the beam, means for laterally deflecting electrons from their original linear courses by amounts which depend upon the respective electron velocities and a wave guide positioned across the path of the deflected electrons and having such conformation that the deflected electron beam sweeps the guide along its length with a velocity approximating the wave propagation velocity along the guide.

3. In combination, an electron gun, a pair of deflecting plates between which the electron beam passes, means for velocity modulating the electrons of the beam, means for impressing an electromotive force upon the plates to cause deflection of the electrons from their normal courses in accordance with the velocities of the electrons and a wave energy path traversing the paths of the different electrons along a course such that the propagation velocity of electromagnetic wave energy of the path approximates the velocity along its length with which the beam sweeps the wave energy path.

4. In combination, an electron gun for producing an electron beam, a guide along which wave energy is conducted, the electron beam being directed toward a point on the guide, and means for causing the beam to progressively deviate from its normal path in such manner that its point of incidence on the guide travels along the guide at a rate substantially equal to the propagation velocity of electromagnetic wave energy along the guide.

5. In combination, a source of an electron beam, means for varying the velocities of the electrons in accordance with a control force, a deflecting device for deflecting electrons while the velocities are accelerating in one direction, and means for utilizing the energy of the electrons during the periods in which their velocities are accelerating in the opposite direction comprising an elongated wave guide which intercepts the paths of the deflected electrons in such manner that the electron beam sweeps along the length of the wave guide at a speed approximately corresponding to an electromagnetic wave propagation velocity of the guide.

6. The combination of claim 5, characterized in this that the wave guide intercepts the paths of all the electrons so as to extract energy from the electron beam.

7. A source of electrons of substantially uniform speed at a given point in their course, means for velocity modulating the electrons in accordance with a control force, means for deflecting the electrons in an amount depending upon their velocities and a wave guide so positioned with respect to the courses of the different speed electrons as to be effectively swept by the electron beam at a speed along its length approximately corresponding to the wave propagation velocity of electromagnetic waves along the length of the wave guide.

8. A source of electrons of substantially uniform speed at a given point, means for velocity modulating the electrons in accordance with a varying control electromotive force, means for separating the course of electrons which pass a given point during the interval that the speeds at which the electrons pass that point are increasing from the courses of the electrons passing during the retarding interval, a wave guide, and means whereby the electrons of all of the courses are caused to impart energy to the wave guide.

THORNTON C. FRY.